United States Patent
Kubba (10) Patent No.: US 9,210,494 B1
(45) Date of Patent: *Dec. 8, 2015

(54) EXTERNAL VIBRATION REDUCTION IN BONE-CONDUCTION SPEAKER

(71) Applicant: Google Inc., Mountain View, CA (US)

(72) Inventor: Michael Kubba, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,264

(22) Filed: Jun. 27, 2014

Related U.S. Application Data (63) Continuation of application No. 13/490,302, filed on Jun. 6, 2012, now Pat. No. 8,798,292.

(51) Int. Cl.
 *H04R 25/00* (2006.01)
 *H04R 1/10* (2006.01)
 *H04R 3/00* (2006.01)

(52) U.S. Cl.
 CPC .............. *H04R 1/105* (2013.01); *H04R 1/1016* (2013.01); *H04R 3/002* (2013.01)

(58) Field of Classification Search
 CPC .. H04R 2460/13; H04R 1/105; H04R 1/1075; H04R 1/1016; H04R 1/16; H04R 1/18
 USPC ......... 381/150, 151, 370, 371, 380, 312, 322, 381/326, 328, 162, 361; 181/131, 135
 See application file for complete search history.

(56) References Cited

U.S. PATENT DOCUMENTS

| 6,091,546 A | 7/2000 | Spitzer |
| 2003/0012395 A1* | 1/2003 | Fukuda .......................... 381/380 |
| 2006/0286998 A1 | 12/2006 | Fukuda |
| 2011/0224481 A1 | 9/2011 | Lee et al. |

FOREIGN PATENT DOCUMENTS

| JP | 2007-189578 | 7/2007 |
| JP | 2007-189578 A | 7/2007 |

(Continued)

OTHER PUBLICATIONS

International Search Report from corresponding international application No. PCT/US2013/040857.

(Continued)

*Primary Examiner* — Sunita Joshi
(74) *Attorney, Agent, or Firm* — McDonnell Boehnen Hulbert & Berghoff LLP (57) ABSTRACT

This disclosure relates to bone conduction. One disclosed apparatus includes a support structure and a bone-conduction transducer (BCT). The support structure includes a front section and a side section. The side section includes a recessed structure and at least one member that extends from the recessed structure. The BCT includes a first portion and a second portion. The first portion is in contact with the at least one member such that at least one gap is defined between the BCT and the recessed structure. When the support structure is worn, the second portion is in contact with a wearer so as to transmit a target vibration of the second portion to a bone structure of the wearer. The at least one member is configured to transmit a vibration of the first portion of the BCT to the recessed structure.

20 Claims, 6 Drawing Sheets

(56) References Cited

FOREIGN PATENT DOCUMENTS

WO   2009-136498        11/2009
WO   2009-136498 A1   11/2009

OTHER PUBLICATIONS

Written Opinion from corresponding international application No. PCT/US2013/040857.
Written Opinion from corresponding application No. PCT/US2013/040857.

* cited by examiner

EXTERNAL VIBRATION REDUCTION IN BONE-CONDUCTION SPEAKER

CROSS-REFERENCE TO RELATED APPLICATIONS

This application claims priority to U.S. application Ser. No. 13/490,302, filed Jun. 6, 2012, which is hereby incorporated by reference in its entirety.

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's eye (or eyes) such that the displayed image fills or nearly fills the field of view, and appears as a normal sized image, such as an image that might be displayed on a traditional image display device. The relevant technology may be referred to as "near-eye displays."

Near-eye displays are fundamental components of wearable displays, sometimes called "head-mounted displays" (HMDs). An HMD places a graphic display close to one or both eyes of a wearer. To generate the images on a display, a computer processing system can be used. Such displays can occupy a wearer's entire field of view, or only occupy part of wearer's field of view. Further, HMDs can be as small as a pair of glasses or as large as a helmet.

SUMMARY

This disclosure provides a first apparatus. The first apparatus includes a support structure. The support structure includes a front section and a side section. The side section includes a recessed structure and at least one member that extends from the recessed structure. The first apparatus also includes a bone-conduction transducer. The bone-conduction transducer includes a first portion and a second portion. The first portion is in contact with the at least one member such that at least one gap is defined between the bone-conduction transducer and the recessed structure. When the support structure is worn, the second portion is in contact with a wearer so as to transmit a target vibration of the second portion to a bone structure of the wearer. The at least one member is configured to transmit a vibration of the first portion of the bone-conduction transducer to the recessed structure.

This disclosure also provides a second apparatus. The second apparatus includes a support structure. The support structure includes a recessed structure. A cavity is defined in the recessed structure. The second apparatus includes at least one member. The at least one member extends from the recessed structure toward the cavity. The support structure is configured to receive a bone-conduction transducer in the cavity such that the at least one member contacts a first portion of the bone-conduction transducer and such that at least one gap is defined between the recessed structure and the bone-conduction transducer. The support structure is further configured such that, when the support structure is worn, a second portion of the bone-conduction transducer contacts a wearer so as to transmit a target vibration of the second portion to a bone structure of the wearer. The support structure is further configured to transmit a vibration resulting from the target vibration to the recessed structure by way of the at least one member.

This disclosure also provides a third apparatus. The third apparatus includes a support structure. The support structure includes a recessed structure. A cavity is defined in the recessed structure. The third apparatus includes two or more members. The two or more members extend from the recessed structure toward the cavity. The two or more members are arranged to receive a bone-conduction transducer in the cavity such that the two or more members contact a first portion of the bone-conduction transducer without the recessed structure contacting the bone-conduction transducer. The two or more members are configured to support the bone-conduction transducer during a target vibration of a second portion of the bone-conduction transducer. The two or more members are further configured to transmit a resulting vibration of the first portion to the recessed structure.

Other aspects, embodiments, and implementations will become apparent to those of ordinary skill in the art by reading the following detailed description, with reference where appropriate to the accompanying drawings.

DETAILED DESCRIPTION

Overview

A head-mountable device, such as, for example, a glasses-style device, can include a bone-conduction speaker. Bone-conduction speakers function on a principle known as bone conduction. A bone-conduction speaker typically includes a transducer, which can receive an electrical signal, such as, for example, an audio signal, and responsively generate a controlled vibration. In this disclosure, such a transducer is termed a "bone-conduction transducer." When worn, the bone-conduction transducer can transmit a controlled vibration to bones of the wearer's skull. The bones, in turn, transmit the vibration to the wearer's inner ear. Accordingly, bone conduction enables sound to be transmitted to the wearer's inner ear by way of vibrations transmitted to the wearer's bones, rather than by way of sound waves that enter the wearer's outer ear through air.

Typically, when a bone-conduction speaker operates, in addition to the speaker's transducer generating a controlled vibration to bones of the wearer's skull, other components of the speaker can generate and transmit undesirable vibrations to other surfaces, such as a surface of the enclosure in which the bone-conduction speaker is provided. In this disclosure, these undesirable vibrations are termed "external vibrations" for ease of explanation. The transmission of the external vibrations to other surfaces can generate external sounds or, in other words, sound waves that enter the wearer's outer ear through air. The wearer can find these external sounds undesirable and distracting.

In some implementations, an apparatus can be used to reduce such external sounds. The apparatus includes a support structure with at least one front section and at least one side section. The side section includes a recessed structure and at least one member that extends from the recessed structure. The apparatus also includes a bone-conduction transducer. The bone-conduction transducer includes a first portion and a second portion. The first portion is in contact with the at least one member such that at least one gap is defined between the bone-conduction transducer and the recessed structure. When the support structure is worn, the second portion is in contact with a wearer so as to transmit a target vibration of the second portion to a bone structure of the wearer. The at least one member is configured to transmit a vibration of the first portion of the bone-conduction transducer to the recessed structure.

In this apparatus, the at least one member can serve to support the bone-conduction transducer while providing limited contacts points for the bone-conduction transducer to transmit undesirable, external vibration. Accordingly, this apparatus can be used to reduce a bone-conduction transducer's generation of undesirable sound waves that might otherwise enter a wearer's outer ear through air.

Examples of Wearable Computing Devices

Figure 1A:
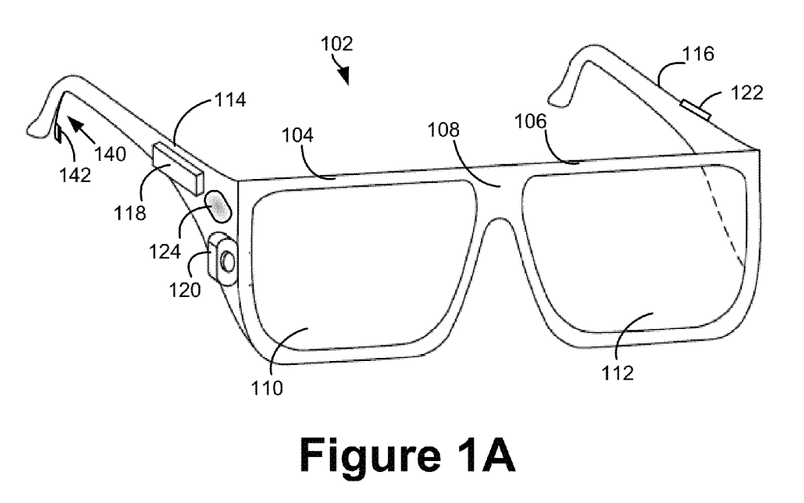
FIGS. 1A and 1B illustrate a wearable computing system, according to an embodiment.
Figure 1B:
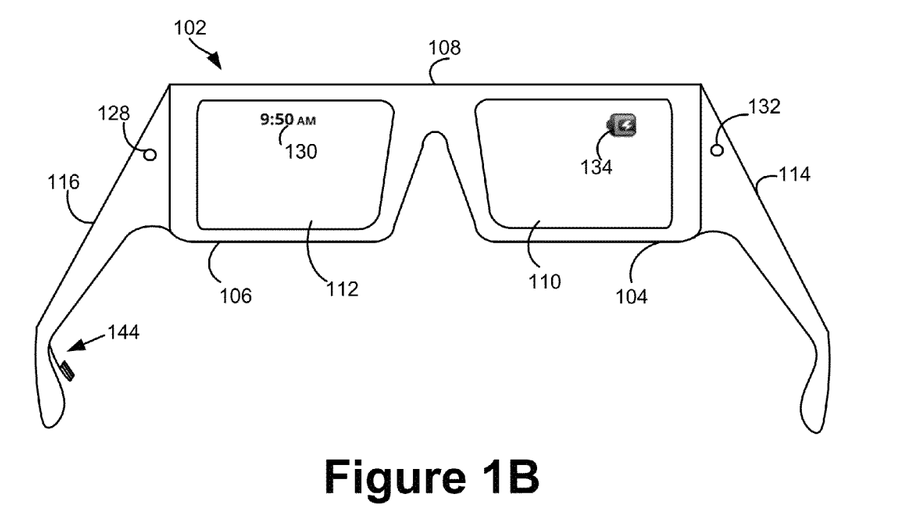

FIGS. 1A and 1B illustrate a wearable computing system, according to an embodiment. The wearable computing system is shown in the form of a head-mountable device (HMD) 102 (which may also be referred to in this disclosure as a head-mountable display). In general, the HMD 102 can include a front section and at least one side section. In FIG. 1A, the support structure has a front section that includes lens-frames 104, 106 and a center frame support 108. In addition, in FIG. 1A, the side-arms 114 and 116 and/or the ear-piece 142 can serve as the first and/or second side section of the support structure. It should be understood that the front section and the at least one side section may vary in form, depending upon the implementation.

The HMD 102 includes lens-frames 104, 106, a center frame support 108, lens elements 110, 112, and extending side-arms 114, 116. The center frame support 108 and the extending side-arms 114, 116 are configured to secure the HMD 102 to a wearer's face by way of the wearer's nose and ears, respectively.

Each of the frame elements 104, 106, 108 and the extending side-arms 114, 116 can be formed of a solid structure of plastic and/or metal, or can be formed of a hollow structure of similar material so as to allow wiring and component interconnects to be internally routed through the HMD 102. Other materials can be used as well.

One or more of each of the lens elements 110, 112 can be formed of any material that can suitably display a projected image or graphic. Each of the lens elements 110, 112 can also be sufficiently transparent to allow a wearer to see through the lens element. Combining these two features of the lens elements can facilitate an augmented reality or heads-up display where the projected image or graphic is superimposed over a real-world view as perceived by the wearer through the lens elements.

The extending side-arms 114, 116 can each be projections that extend away from the lens-frames 104, 106, respectively, and can be positioned behind a wearer's ears to secure the HMD 102 to the wearer. The extending side-arms 114, 116 can further secure the HMD 102 to the wearer by extending around a rear portion of the wearer's head.

The HMD 102 can also include an on-board computing system 118, a video camera 120, a sensor 122, and a finger-operable touch pad 124. The on-board computing system 118 is shown to be positioned on the extending side-arm 114 of the HMD 102; however, the on-board computing system 118 can be provided on other parts of the HMD 102 or can be positioned remote from the HMD 102 (for example, the on-board computing system 118 could be wire- or wirelessly-connected to the HMD 102). The on-board computing system 118 can include a processor and memory, for example. The on-board computing system 118 can be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the HMD 102; however, the video camera 120 can be provided on other parts of the HMD 102. The video camera 120 can be configured to capture images at various resolutions or at different frame rates. Many video cameras with a small form-factor, such as those used in cell phones or webcams, for example, can be incorporated into an example of the HMD 102.

Further, although FIG. 1A illustrates one video camera 120, more video cameras can be used, and each can be configured to capture the same view, or to capture different views. For example, the video camera 120 can be forward facing to capture at least a portion of the real-world view perceived by the wearer. This forward facing image captured by the video camera 120 can then be used to generate an augmented reality where computer generated images appear to interact with the real-world view perceived by the wearer.

The sensor 122 is shown on the extending side-arm 116 of the HMD 102; however, the sensor 122 can be positioned on other parts of the HMD 102. The sensor 122 can include one or more of a gyroscope or an accelerometer, for example. Other sensing devices can be included within, or in addition to, the sensor 122 or other sensing functions can be performed by the sensor 122.

The finger-operable touch pad 124 is shown on the extending side-arm 114 of the HMD 102. However, the finger-operable touch pad 124 can be positioned on other parts of the HMD 102. Also, more than one finger-operable touch pad can be present on the HMD 102. The finger-operable touch pad 124 can be used by a wearer to input commands. The finger-operable touch pad 124 can sense at least one of a position and a movement of a finger by way of capacitive sensing, resistance sensing, or a surface acoustic wave process, among other possibilities. The finger-operable touch pad 124 can be capable of sensing finger movement in a direction parallel or planar to the pad surface, in a direction normal to the pad surface, or both, and can also be capable of sensing a level of pressure applied to the pad surface. The finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a wearer when the wearer's finger reaches the edge, or other area, of the finger-operable touch pad 124. If more than one finger-operable touch pad is present, each finger-operable touch pad can be operated independently, and can provide a different function.

In addition, an ear-piece 140 is attached to the right side-arm 114 of the HMD 102. The ear-piece 140 includes a bone-conduction speaker 142. In some implementations, the bone-conduction speaker 142 can be arranged such that when the HMD 102 is worn, the bone-conduction speaker 142 is positioned to the posterior of the wearer's ear. In some implementations, the ear-piece 140 can be moveable such that the bone-conduction speaker 142 can contact the back of the wearer's ear. In some implementations, the ear-piece can be configured such that the bone-conduction speaker 142 can contact the auricle of the wearer's ear. These implementations are merely illustrative; other configurations of the ear-piece 140 are possible.

The bone-conduction speaker 142 can take various forms. For instance, the bone-conduction speaker 142 can be implemented in connection with a vibration transducer that is configured as a bone-conduction transducer. Note that any component that is arranged to vibrate a wearer's bone structure can be incorporated as a bone-conduction speaker.

The HMD 102 can include at least one audio source (not shown) that is configured to provide an audio signal that drives the bone-conduction speaker 142. In some implementations, the HMD 102 can include a microphone, an on-board computing system that is configured to play digital audio files, and/or an audio interface to an auxiliary audio playback device, such as a portable digital audio player, smartphone, home stereo, car stereo, and/or personal computer. The interface to an auxiliary audio playback device can be a tip, ring, sleeve (TRS) connector, or can take another form. Other audio sources and/or audio interfaces are possible.

FIG. 1B illustrates another view of the HMD 102 illustrated in FIG. 1A. As shown in FIG. 1B, the lens elements 110, 112 can act as display elements. The HMD 102 can include a first projector 128 coupled to an inside surface of the extending side-arm 116 and configured to project a display 130 onto an inside surface of the lens element 112. A second projector 132 can be coupled to an inside surface of the extending side-arm 114 and can be configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used (for example, when the projectors 128, 132 are scanning laser devices).

In some implementations, other types of display elements can be used. For example, the lens elements 110, 112 can include a transparent or semi-transparent matrix display, such as an electroluminescent display or a liquid crystal display; one or more waveguides for delivering an image to the wearer's eyes; and other optical elements capable of delivering an in focus near-to-eye image to the wearer. A corresponding display driver can be disposed within the frame elements 104, 106 for driving such a matrix display. A laser or LED source and scanning system can be used to draw a raster display directly onto the retina of one or more of the wearer's eyes. These examples are merely illustrative; other possibilities exist as well.

The HMD 102 is shown not to include an ear-piece 140 on the right side-arm 114. Instead, the HMD includes a similarly configured ear-piece 144 on the left side-arm 116, which includes a bone-conduction speaker that is configured to transfer vibration to the wearer by way of the back of the wearer's ear.

Figure 1C:
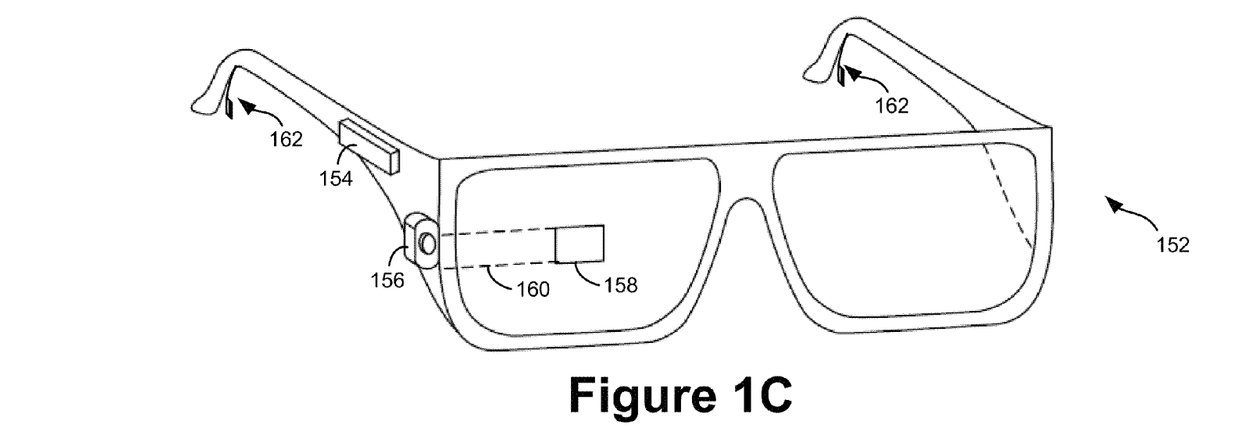
FIG. 1C illustrates another wearable computing system, according to an embodiment.

FIG. 1C illustrates another wearable computing system, according to an embodiment. The wearable computing system is in the form of an HMD 152. The HMD 152 can include frame elements and side-arms, such as those described above in connection with FIGS. 1A and 1B. In addition, the HMD 152 can include an on-board computing system 154 and a video camera 206, such as those described above in connection with FIGS. 1A and 1B. The video camera 206 is shown mounted on a frame of the HMD 152. However, the video camera 206 can be mounted at other positions as well.

As shown in FIG. 1C, the HMD 152 can include a single display 158, which can be coupled to the HMD 152. The display 158 can be formed on one of the lens elements of the HMD 152, such as, for example, a lens element described above in connection with FIGS. 1A and 1B, and can be configured to overlay computer-generated graphics in the wearer's view of the physical world. The display 158 is shown to be provided in a center of a lens of the HMD 152; however, the display 158 can be provided in other positions as well. The display 158 is controllable by way of the computing system 154, which is coupled to the display 158 by way of an optical waveguide 160.

The HMD 152 includes two ear-pieces 162 with bone-conduction speakers, located on the left and right side-arms of the HMD 152. The ear-pieces 162 can be configured in a similar manner as the ear-pieces 140 and 144. Each ear-piece 162 includes a bone-conduction speaker, which can be arranged such that when the HMD 152 is worn, the bone-conduction speaker is positioned to the posterior of the wearer's ear. In addition, each ear-piece 162 can be moveable such that the bone-conduction speaker can contact the back of the respective ear.

Because the HMD 152 includes two ear-pieces 162, the ear-pieces 162 can be configured to provide stereo audio. As such, the HMD 152 can include at least one audio source (not shown) that is configured to provide stereo audio signals. The audio signals can be used to drive the bone-conduction speakers 162.

Figure 1D:
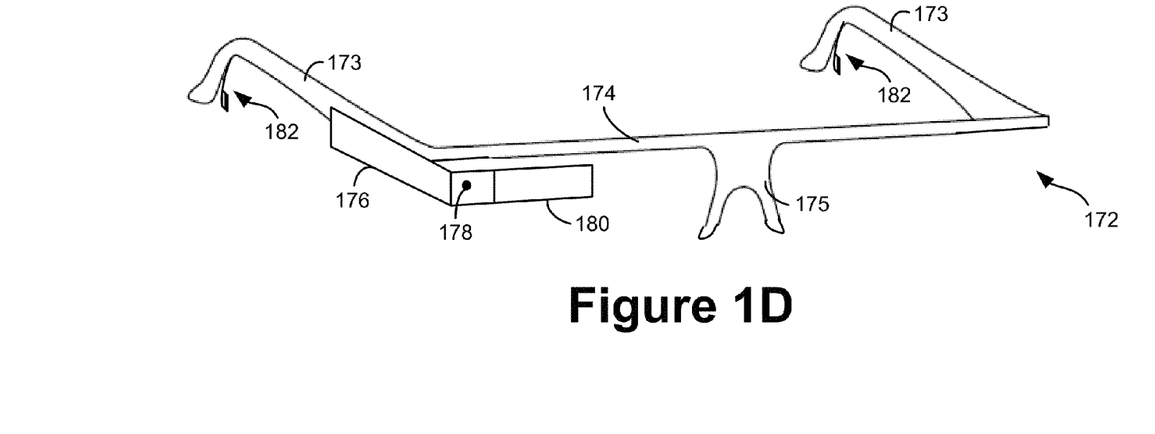
FIG. 1D illustrates another wearable computing system, according to an embodiment.

FIG. 1D illustrates another wearable computing system, according to an embodiment. The wearable computing system is in the form of an HMD 172. The HMD 172 can include side-arms 173, a center frame support 174, and a bridge portion with a nosepiece 175. The center frame support 174 connects the side-arms 173. The HMD 172 is shown not to include lens-frames containing lens elements. The HMD 172 can include an on-board computing system 176 and a video camera 178, such as those described above in connection with FIGS. 1A and 1B.

The HMD 172 can include a single lens element 180, which can be coupled to one of the side-arms 173 or to the center frame support 174. The lens element 180 can include a display, such as, for example, the display described above in connection with FIGS. 1A and 1B. The lens element 180 can be configured to overlay computer-generated graphics upon the wearer's view of the physical world. For example, the single lens element 180 can be coupled to the inner side (the side exposed to a portion of a wearer's head when worn by the wearer) of the extending side-arm 173. The single lens element 180 can be positioned in front of or proximate to a wearer's eye when the HMD 172 is worn by a wearer. For example, the single lens element 180 can be positioned below the center frame support 174, as shown in FIG. 1D.

The HMD 172 is shown to include two ear-pieces 182 with bone-conduction speakers, which are located on the left and right side-arms of the HMD 152. The ear-pieces 182 can be configured in a similar manner as the ear-pieces 162 of the HMD 152.

Figure 1E:
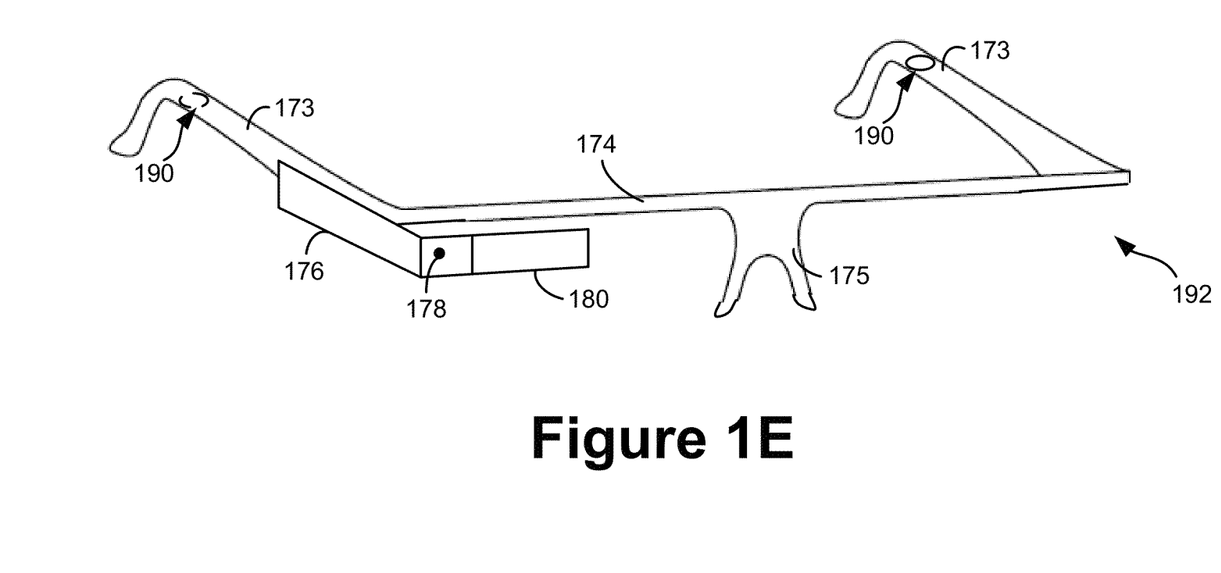
FIG. 1E illustrates another wearable computing system, according to an embodiment.

FIG. 1E illustrates another example of a wearable computing device. The wearable computing device is in the form of an HMD 192. The HMD 192 includes two ear-pieces 190 with bone-conduction transducers, which are located on the left and right side-arms of HMD 152. The ear-pieces 190 can be configured in a similar manner as the ear-pieces 162 of the HMD 152. However, the ear-pieces 190 are mounted on the frame of the HMD 192, rather than being mounted to extensions of the frame. Ear-pieces similar to the ear-pieces 190 can be used in place of the ear pieces shown in FIGS. 1A to 1D.

Figure 2:
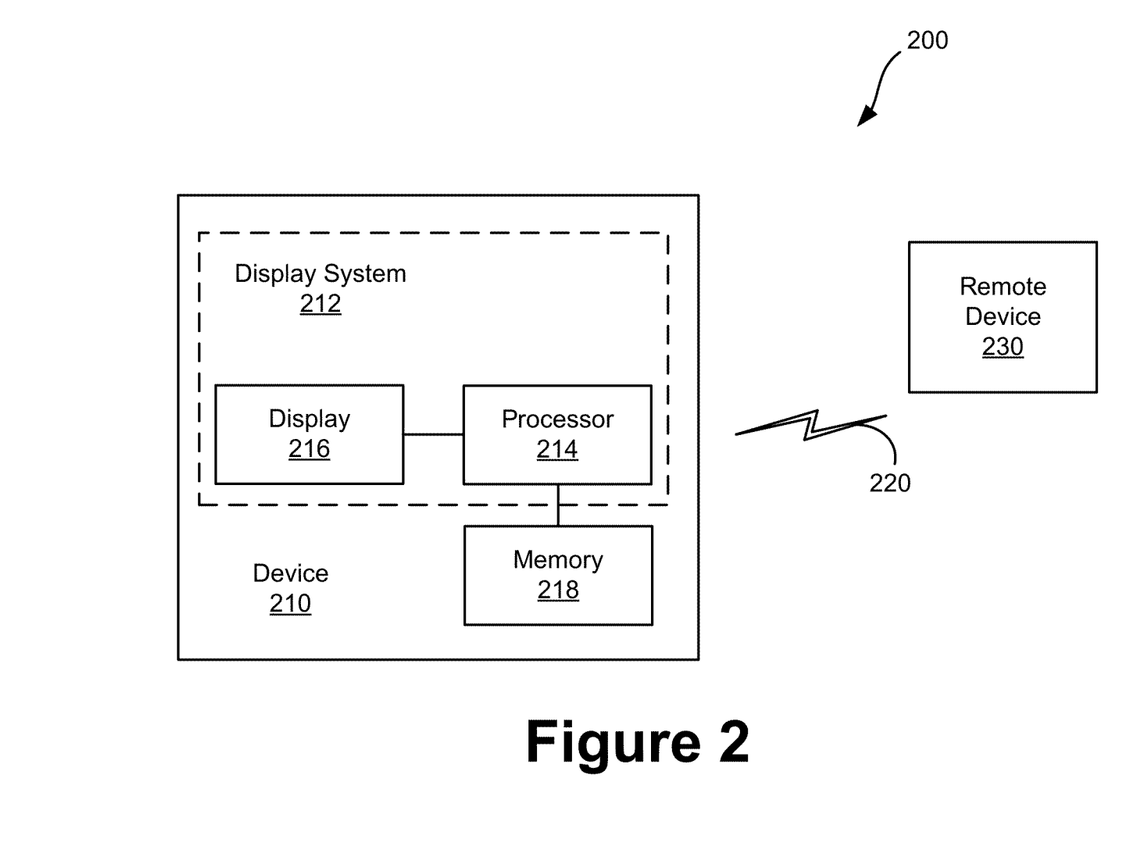
FIG. 2 illustrates a computing device, according to an embodiment.

FIG. 2 illustrates a schematic illustration of a computing device, according to an embodiment. In the system 200, a device 210 communicates using a communication link 220 (for example, a wired or wireless connection) to a remote device 230. The device 210 can be any type of device that can receive data and display information corresponding to or associated with the data. For example, the device 210 can be an HMD, such as, for example, the HMDs 102, 152, 172, 192 discussed above in connection with FIGS. 1A-1E.

The device 210 can include a display system 212. The display system 212 a processor 214 and a display 216. The display 210 can be, for example, an optical see-through display, an optical see-around display, or a video see-through display. The processor 214 can receive data from the remote device 230, and configure the data for display on the display 216. The processor 214 can be any type of processor, such as, for example, a micro-processor or a digital signal processor.

The device 210 can further include on-board data storage, such as a memory 218 coupled to the processor 214. The memory 218 can, for example, store software that can be accessed and executed by the processor 214.

The remote device 230 can be any type of computing device or transmitter. Examples include a laptop computer, a mobile telephone, and a tablet computing device. The remote device 230 and the device 210 can contain hardware to enable the communication link 220. Examples of such hardware include processors, transmitters, receivers, and antennas.

The communication link 220 is illustrated as a wireless connection; however, wired connections can also or instead be used. For example, the communication link 220 can be a wired serial bus, such as a universal serial bus or a parallel bus. A wired connection can be a proprietary connection as well. The communication link 220 can also be a wireless connection using, for example, Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 230 can be accessible by way of the Internet and can include a computing cluster associated with a particular web service, such as, for example, social-networking, photo sharing, or an address book.

Example of a Bone-Conduction Transducer

Figure 3A:
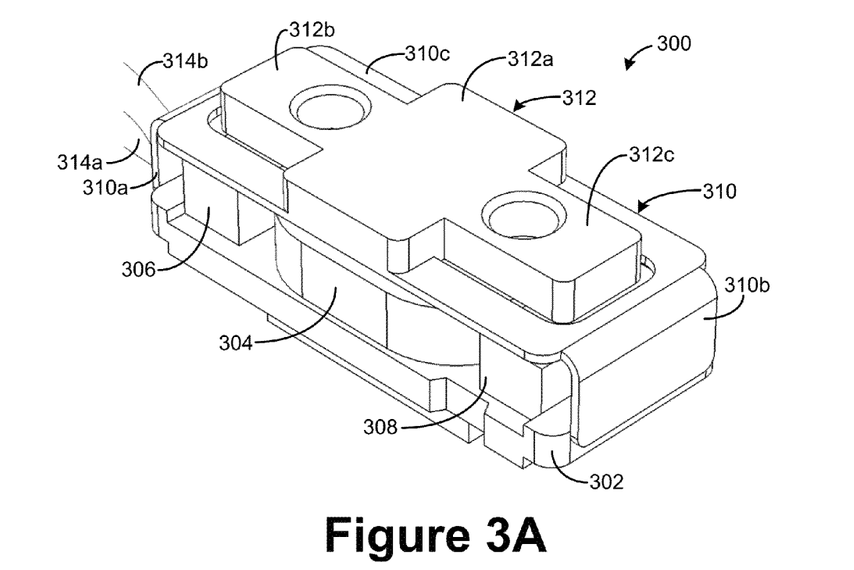
FIGS. 3A-3B illustrate a bone-conduction transducer, according to an embodiment.
Figure 3B:
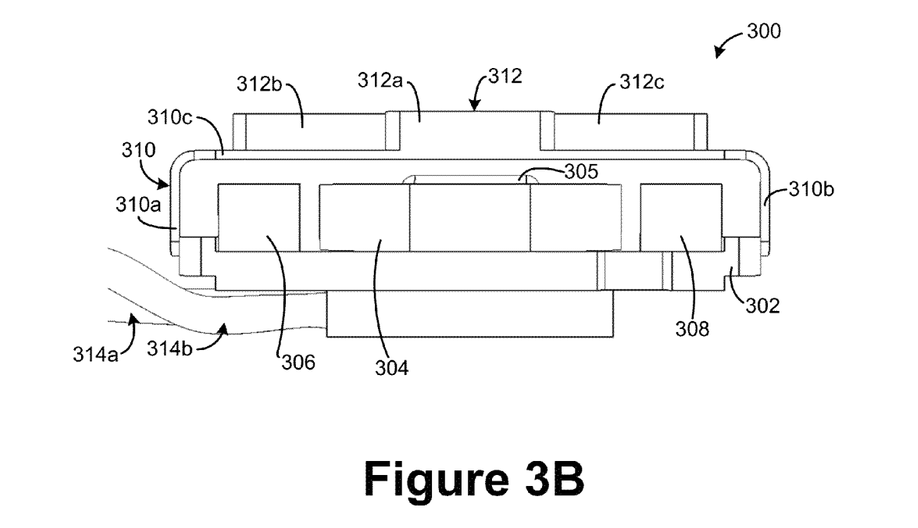

FIGS. 3A and 3B illustrate a bone-conduction transducer 300, according to an embodiment. The bone-conduction transducer 300 can be incorporated into a wearable computing system, such as, for example, the wearable computing systems 102, 152, 172, 192 shown and discussed above in connection with FIGS. 1A-1E. In general, when an apparatus containing the bone-conduction transducer 300 is worn, the bone-conduction transducer 300 is configured to transmit a vibration to a bone structure of the wearer in response to receiving a suitable electrical signal. To this end, the bone-conduction transducer 300 includes a base 302, a coil 304, a core 305, magnets 306, 308, a diaphragm 310, and an anvil 312. For ease of explanation, the bone-conduction transducer 300 is shown in simplified form. Note that the bone-conduction transducer 300 can include components other than those shown in FIGS. 3A and 3B.

In the bone-conduction transducer 300, the coil 304 is wrapped around the core 305. The coil 304 can be any suitable wire coil. In addition, the core 305 can be formed of any material or combination of materials that renders the core 305 ferromagnetic. The core 305 is coupled to a top surface of the base 302. Likewise, the magnets 306, 308 are coupled to the top surface of the base 302 and are disposed on different sides of the core 305.

In addition, the diaphragm 310 is coupled to the base 302. In particular, the diaphragm 310 includes side portions 310a, 310b and a top portion 310c. The side portions 310a, 310b of the diaphragm 310 are coupled to respective side surfaces of the base 302. For example, the side portions 310a, 310b can be laser-welded to the respective side surfaces of the base 302. As shown in FIGS. 3A and 3B, the diaphragm 310 extends over the top of the magnets 306, 308, the core 305, and the coil 304. In addition, the diaphragm 310 can be formed of any material or combination of materials that renders the diaphragm 310 relatively flexible, as well as non-magnetic or substantially non-magnetic.

In addition, the anvil 312 is coupled to the top portion 310c of the diaphragm 310. In particular, the anvil 312 includes a center portion 312a and side portions 312b, 312c. The side portions 312b, 312c are narrower in width than the center portion 312a, but need not be narrower in width than the center portion 312a in other implementations. The center portion 312a of the anvil 312 is coupled to the top portion 310c of the diaphragm 310. For example, the center portion 312a of the anvil 312 can be laser-welded to the top portion 310c of the diaphragm 310. Note that the side portions 312b, 312c of the anvil 312 are not affixed to the top portion 310c of the diaphragm 310. In addition, note that there is a gap between the top portion 310c of the diaphragm 310 and each of the side portions 312b, 312c of the anvil 312. In addition, the anvil 312 is provided with holes that extend through each of the sides portions 312b, 312c of the anvil 312.

The anvil 312 can be formed of any material or combination of materials that renders the anvil 312 magnetic. For example, the anvil 312 can be formed of iron. As another example, the anvil 312 can have a substantially non-magnetic component (such as, for example, aluminum) and a magnetic component (such as, for example, iron).

As discussed above, the bone-conduction transducer 300 can be incorporated into a wearable computing system, such as, for example, the wearable computing systems shown and discussed above in connection with FIGS. 1A-1E. For example, the bone-conduction transducer 300 can be incorporated in the bone-conduction speaker 142 shown in FIG. 1A. In general, the bone-conduction-transducer 300 can be arranged in an apparatus such that, when the apparatus is worn, the anvil 312 of the bone-conduction transducer 300 faces the wearer and is positioned at a desired location near the wearer's head. For example, the anvil 312 can be positioned to the posterior of the wearer's ear. In addition, when the apparatus is worn, the bone-conduction transducer 300 can be configured such that the anvil 312 touches a surface of the wearer's head and applies a pressure to the surface.

The wires 314a, 314b of the bone-conduction transducer 300 are configured to provide signals, such as, for example, audio signals, to the coil 304. In some implementations, the wires 314a, 314b can be electrically coupled to circuitry. In these implementations, the wires 314a, 314b can transmit a signal to the circuitry. The circuitry can process the signal and then provide the signal to the coil 304. Other implementations are possible.

In operation, when an apparatus containing the bone-conduction transducer is worn, the bone-conduction transducer 300 is configured to transmit a vibration to a bone structure of the wearer in response to receiving a suitable electrical signal. In particular, the wires 314a, 314b can transmit an electrical signal, such as, for example, an audio signal, to the coil 304. The electrical signal that is applied through the coil 304 can induce a time-varying magnetic field, which can vary proportionally to the electrical signal. The induced magnetic field can magnetize the ferromagnetic core 305. The magnetized ferromagnetic core 305, together with the magnets 306, 308, can apply time-varying magnetic forces to the magnetic anvil 312, causing the anvil 312, along with the relatively flexible diaphragm 310 coupled to the anvil 312, to vibrate in a controlled manner. Because the anvil 312 is positioned to touch a surface of the wearer's head, the vibrating anvil 312 can transmit a vibration to the bone structure of the wearer and, in turn, to the wearer's inner ear.

The bone-conduction transducer 300 serves as an example of a type of electromagnetic transducer. The apparatuses discussed in this disclosure are not limited to the bone-conduction transducer 300 or to use with the bone-conduction transducer 300. In addition, the methods provided in this disclosure are not limited to use with the bone-conduction transducer 300. In other words, the methods provided in this disclosure can be implemented in connection with a different bone-conduction transducer or, more generally, with another electromagnetic transducer.

As discussed above, when a bone-conduction speaker typically operates, in addition to the speaker's bone-conduction transducer generating a controlled vibration to bones of the wearer's skull, other components of the speaker can generate and transmit undesirable external vibrations to other surfaces, such as a surface of the enclosure in which the bone-conduction speaker is provided. The transmission of the external vibrations to other surfaces can generate external sounds or, in other words, sound waves that enter the wearer's outer ear through air. The wearer can find these external sounds undesirable and distracting. The following section discusses an apparatus that can be used in connection with a bone-conduction transducer, such as, for example, the bone-conduction transducer 300, to reduce such external vibrations.

Figure 4:
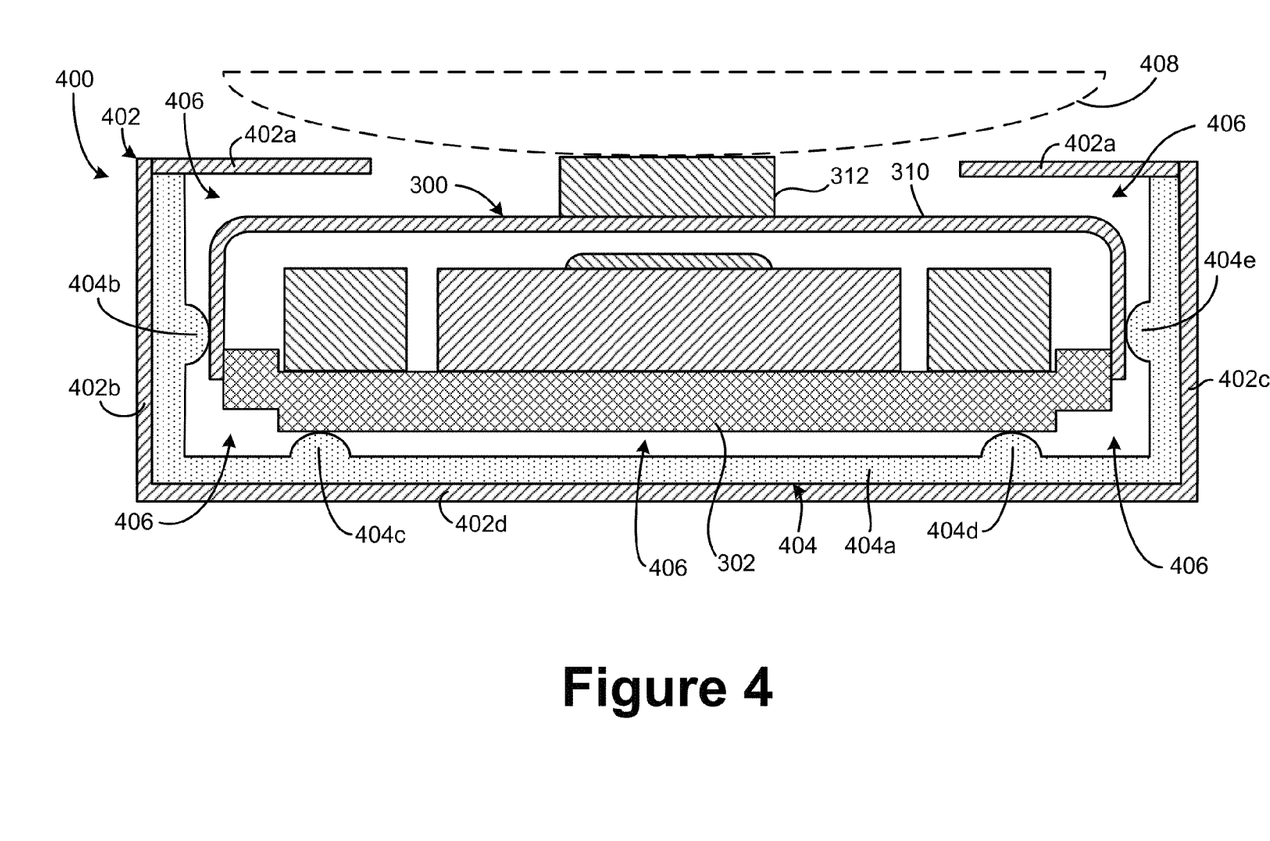
FIG. 4 illustrates an apparatus for reducing external vibration in connection with a bone-conduction transducer.

Example of an Apparatus for External Vibration Reduction in a Bone-Conduction Speaker FIG. 4 illustrates a cross-sectional view of an apparatus 400, according to an embodiment. The apparatus 400 can be used for external vibration reduction in a bone-conduction speaker. The apparatus 400 can be used, for example, in the bone-conduction speaker 142 of the ear-piece 140 illustrated in FIG. 1A. In addition, the apparatus 400 can be used, for example, in one or both of the ear-pieces 190 shown in FIG. 1E. Note that the apparatus 400 is not limited for use in connection with the wearable devices shown in FIGS. 1A-1E; the apparatus 400 can be used in connection with a different wearable device. For ease of explanation, the apparatus 400 is shown in connection with the bone-conduction transducer 300 illustrated in FIG. 3. Note that the apparatus 400 can be used in connection with another bone-conduction transducer or, more generally, in connection with another electromagnetic transducer.

The apparatus 400 includes a housing 402 and a recessed structure 404. The housing 402 includes a top portion 402a, side portions 402b and 402c, and a bottom portion 402d. The housing 402 can be formed of any suitable material or combination of materials, depending on the desired implementation. For example, the housing 402 can be formed of plastic.

The recessed structure 404 is disposed in the housing 402. In particular, the recessed structure 404 abuts the side portions 402b, 402c and the bottom portion 402d, and partially abuts the top portion 402a of the housing 402. In some implementations, the recessed structure 404 can be placed in the housing in the manner shown without being affixed to the housing 402. In other implementations, the recessed structure 404 can be affixed to the housing 402.

The recessed structure 404 includes a base portion 404a and several members 404b-404e that extend from the base portion 404b. As shown in FIG. 4, the member 404b extends from the part of the base portion 404b that abuts the side portion 402b of the housing 402. In addition, the members 404c and 404d extend from the part of the base portion 404b that abuts the bottom portion 402d of the housing 402. In addition, the member 404e extends from the part of the base portion 404b that abuts the side portion 402c of the housing 402. Accordingly, the members 404b-404e extend from the base portion 404a in different directions. Note that in some implementations, members of a recessed structure need not extend in different directions.

The recessed structure 404 can be formed of any material or combination of materials that renders all or portions of the recessed structure 404 substantially pliable. For example, the recessed structure 404 can be formed of rubber, foam, or an elastomer. These examples are merely illustrative; the recessed structure 404 can be formed of any other suitable material or combination of materials that renders all or portions of the recessed structure 404 substantially pliable. In some implementations, certain portions of the recessed structure 404 can be formed of a material or combination of materials that renders those portions substantially pliable, while other portions of the recessed structure 404 can be formed for a material or combination of materials that renders those other portions relatively less pliable. For example, the members 404b-404e can be formed of a substantially pliable material, such as, for example, an elastomer, while the base portion 404a can be formed of a relatively less pliable material, such as, for example, plastic. This example is merely illustrative; other configurations are possible.

As mentioned above, the bone-conduction transducer 300 is disposed in the housing 402 of the apparatus 400. In particular, the bone-conduction transducer 300 is disposed in a cavity of the housing 402, defined between the top portion 402a of the housing 402 and the recessed structure 404. The diaphragm 310 of the bone-conduction transducer 300 is in contact with the members 404b, 404e of the recessed structure 404. In addition, the base 302 of the bone-conduction transducer 300 is in contact with the members 404c and 404d of the recessed structure 404. Accordingly, the bone-conduction transducer 300 is disposed at a rest position in which the bone-conduction transducer 300 is in contact with a limited number of relatively pliable contact points, namely the members 404b-404e of the recessed structure 404.

With respect to the apparatus 400 shown in FIG. 4, assume that the members 404b-404e do not extend along the entire width of the cavity of the housing 402. Accordingly, when the bone-conduction transducer 300 is disposed at the rest position, as shown in FIG. 4, an air gap 406 is defined in the cavity of the housing 402 between the bone-conduction transducer 300 and the base portion 404a of the recessed structure 404. In some implementations, one or more of the members 404b-404e can extend along the entire width of the cavity of the housing 402. Accordingly, in these implementations, when the bone-conduction transducer 300 is disposed at the rest position, multiple air gaps can be defined in the cavity of the housing 402 between the bone-conduction transducer 300 and the base portion 404a of the recessed structure 404.

While FIG. 4 shows the recessed structure 404 to include four members, namely members 404b-404e, in other implementations, the recessed structure 404 can include a different number of members. In general, the recessed structure 404 can include one or more members. In addition, the members 404b-404e can be arranged in any manner, depending on the desired implementation. In addition, while FIG. 4 shows the members 404b-404e to extend only from the bottom and side portions of the recessed structure 404, in other implementations, the recessed structure 404 can extend along more of the top portion 402a of the housing 402 and one or more members can extend from the top portion of the recessed structure 404 toward the diaphragm 310 of the bone-conduction transducer 300. In addition, while FIG. 4 shows the recessed structure 404 to include both a base portion 404a and members 404b-404e, in other implementations, a recessed structure can be configured in other ways. In some implementations, one or more members can extend directly from the housing 402. In these implementations, the recessed structure is said to be or include the side portions 402b, 402c of the housing 402, as well as the one or more members. In addition, in some implementations, the base portion 404a can be considered the "recessed structure," and the members 404b-404e can be considered to extend from the recessed structure. In addition, in some implementations, the members 404b-404e can be formed integrally with the base portion 404a, while in other implementations, one or more of the members 404b-404e can be one or more components separate from and affixed to the base portion 404a.

In addition, while FIG. 4 shows the gap 406 to be an air gap, in other implementations, the area corresponding to the gap can be filled with a different type of fluid. In some implementations, there may be no air gap or a minimal air gap between the recessed structure and the bone-conduction transducer 300. In these implementations, the recessed structure can be configured so that the recessed structure continuously abuts the bone-conduction transducer 300. In addition, in these implementations, the recessed structure can be formed of any suitable material or combination of materials that renders the recessed structure substantially pliable, at least at all or substantially all of the portions that abut the bone-conduction transducer 300. Examples of such materials include rubber, foam, or an elastomer. These examples are merely illustrative; other configurations and materials are possible.

In operation, when the apparatus 400 is worn, the bone-conduction transducer 300 can receive an electrical signal and responsively cause the anvil 312 to vibrate in a controller manner while the anvil 312 is in contact with a surface 408 of the wearer. Through these controlled vibrations, the bone-conduction transducer 300 can transmit a vibration to a bone structure of the wearer and, in turn, to the wearer's inner ear. However, the relatively rapid vibration of the anvil 312 can cause other components of the bone-conduction transducer 300 to vibrate as well. For example, the vibration of the anvil 312 can cause vibrations of the base 302 of the bone-conduction transducer 300. If the base 302, while vibrating, were placed in continuous contact with a relatively hard surface, then the vibrations of the base 302 could generate external sounds, or in other words, sound waves that enter the wearer's outer ear through air. The wearer can find these external sounds undesirable and distracting.

In the apparatus 400, the base 302 and the diaphragm 310 are in contact with a limited number of relatively pliable contact points, namely the members 404b-404e of the recessed structure 404. Accordingly, when the base 302 or the diaphragm 310 undesirably vibrates as a result of the desired, controlled vibrations of the anvil 312, the undesirable vibrations can be transmitted in a relatively controlled manner by way of the members 404b-404e toward the base portion 404a of the recessed structure 404. This can reduce the amount of generated external sound, or in other words, sound waves that enter the wearer's outer ear through air.

Conclusion

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. An apparatus comprising:
a component, wherein a recessed structure is disposed within the component, and wherein the recessed structure comprises at least one member that extends from the recessed structure; and
a bone-conduction transducer, wherein the bone-conduction transducer comprises a first portion and a second portion, wherein the first portion is in contact with the at least one member such that at least one gap is defined between the bone-conduction transducer and the recessed structure, and wherein when the apparatus is worn, the second portion is in contact with a wearer so as to transmit a target vibration of the second portion to a bone structure of the wearer,
wherein the at least one member is configured to transmit a vibration of the first portion of the bone-conduction transducer to the recessed structure.

2. The apparatus of claim 1, wherein:
the target vibration of the second portion of the bone-conduction transducer is generated based on an audio signal, and
the vibration of the first portion of the bone-conduction transducer results from the target vibration.

3. The apparatus of claim 1, wherein the bone-conduction transducer is in contact with the at least one member without the bone-conduction transducer being in contact with the recessed structure.

4. The apparatus of claim 1, wherein the first portion of the bone-conduction transducer is in contact with both the at least one member and the recessed structure.

5. The apparatus of claim 1, wherein:
the at least one member comprises multiple members, and
the multiple members comprise a first member that is oriented in a first direction and a second member that is oriented in a different second direction.

6. The apparatus of claim 1, wherein each of the at least one member is substantially pliable.

7. An apparatus comprising:
a component, wherein a recessed structure is disposed within the component, and wherein a cavity is defined by the recessed structure; and
at least one member, wherein the at least one member extends from the recessed structure toward the cavity,
wherein the component is configured to receive a bone-conduction transducer in the cavity such that the at least one member contacts a first portion of the bone-conduction transducer and such that at least one gap is defined between the recessed structure and the bone-conduction transducer, wherein the component is further configured such that, when the apparatus is worn, a second portion of the bone-conduction transducer contacts a wearer so as to transmit a target vibration of the second portion to a bone structure of the wearer, and wherein the component is further configured to transmit a vibration resulting from the target vibration to the recessed structure by way of the at least one member.

8. The apparatus of claim 7, wherein the at least one member is configured to contact the first portion of the bone-conduction transducer such that the recessed structure does not contact the bone-conduction transducer.

9. The apparatus of claim 7, wherein the at least one member is configured to contact the first portion of the bone-conduction transducer such that the recessed structure also contacts the bone-conduction transducer.

10. The apparatus of claim 7, wherein:
the at least one member comprises multiple members, and
the multiple members comprise a first member that is oriented in a first direction and a second member that is oriented in a different second direction.

11. The apparatus of claim 7, further comprising the bone-conduction transducer.

12. The apparatus of claim 7, wherein each of the at least one member is substantially pliable.

13. The apparatus of claim 7, wherein the apparatus takes the form of a head-mountable device, wherein the head-mountable device comprises a front section, and a side section, and wherein the bone-conduction transducer is disposed in the side section.

14. An apparatus comprising:
a component, wherein a recessed structure is disposed within the component, and wherein a cavity is defined in the recessed structure; and
two or more members, wherein the two or more members extend from the recessed structure toward the cavity, wherein the two or more members are arranged to receive a bone-conduction transducer in the cavity such that the two or more members contact a first portion of the bone-conduction transducer without the recessed structure contacting the bone-conduction transducer, wherein the two or more members are configured to support the bone-conduction transducer during a target vibration of a second portion of the bone-conduction transducer, and wherein the two or more members are further configured to transmit a resulting vibration of the first portion to the recessed structure.

15. The apparatus of claim 14, wherein:
the two or more members are configured to contact two or more areas of the bone-conduction transducer; and
the two or more members are further configured to transmit the resulting vibration of the first portion to two or more areas of the recessed structure.

16. The apparatus of claim 14, wherein the two or more members are integrally formed with the recessed structure.

17. The apparatus of claim 14, wherein the two or more members comprise a first member that is oriented in a first direction and a second member that is oriented in a different second direction.

18. The apparatus of claim 14, further comprising the bone-conduction transducer.

19. The apparatus of claim 14, wherein each of the two or more members is substantially pliable.

20. The apparatus of claim 14, wherein the apparatus takes the form of a head-mountable device, wherein the head-mountable device comprises a front section, and a side section, and wherein the bone-conduction transducer is disposed in the side section.

* * * * *